United States Patent
Brand et al.

(10) Patent No.: US 12,110,100 B2
(45) Date of Patent: Oct. 8, 2024

(54) ANTI-ROLL OSCILLATION LANDING WHEEL RIMS FOR ROTORCRAFT

(71) Applicant: Textron Innovations Inc., Providence, RI (US)

(72) Inventors: Albert G. Brand, N. Richland Hills, TX (US); Michael Pujol, Dallas, TX (US); Casey T. Johnson, Arlington, TX (US); Marko Vuga, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 217 days.

(21) Appl. No.: 17/687,625

(22) Filed: Mar. 5, 2022

(65) Prior Publication Data
US 2023/0278701 A1     Sep. 7, 2023

(51) Int. Cl.
 *B64C 25/36* (2006.01)
 *B64C 25/32* (2006.01)

(52) U.S. Cl.
CPC ........ *B64C 25/36* (2013.01); *B64C 2025/325* (2013.01)

(58) Field of Classification Search
CPC ... B64C 25/36; B64C 2025/325; B60C 17/04; B60B 21/04; B60B 7/01
See application file for complete search history.

(56) References Cited

U.S. PATENT DOCUMENTS

| | | | | |
|---|---|---|---|---|
| 2,488,864 | A | * 11/1949 | Handy | B60B 7/01 152/410 |
| 4,235,271 | A | * 11/1980 | Olsen | B60B 7/01 152/154 |
| 6,637,486 | B1 | * 10/2003 | Rolla | B60C 17/04 152/381.6 |

(Continued)

FOREIGN PATENT DOCUMENTS

CN    203282980 U    * 11/2013
CN    115157933 A    * 10/2022

(Continued)

OTHER PUBLICATIONS

Machine translation of CN-203282980-U, Sha Y, Nov. 13, 2013 (Year: 2013).*

(Continued)

*Primary Examiner* — Tien Q Dinh
*Assistant Examiner* — Katherine June Bolek
(74) *Attorney, Agent, or Firm* — Lawrence Youst PLLC (57) ABSTRACT

A landing wheel assembly for a rotorcraft having a light on gear phase during takeoff and landing includes a tire and an anti-roll oscillation rim. The tire has first and second side walls and forms a center aperture. The anti-roll oscillation rim includes a center disc disposed in the aperture of the tire, a first side wall support plate protruding from the center disc and extending at least 25 percent of the vertical length of the first side wall of the tire and a second side wall support plate protruding from the center disc and extending at least 25

(Continued)

percent of the vertical length of the second side wall of the tire. The first and second side wall support plates support the first and second side walls, respectively, to stiffen the tire in the light on gear phase of takeoff and landing, thereby reducing roll oscillations of the rotorcraft.

18 Claims, 8 Drawing Sheets

(56) References Cited

U.S. PATENT DOCUMENTS

| | | | | |
|---|---|---|---|---|
| 2007/0222278 A1* | 9/2007 | Hoisington | ........... | B60B 21/062 |
| | | | | 301/58 |
| 2021/0039774 A1* | 2/2021 | Isaac | ....................... | B64C 25/20 |
| 2021/0155035 A1* | 5/2021 | Nylund | ..................... | B60B 7/01 |

FOREIGN PATENT DOCUMENTS

| | | | | |
|---|---|---|---|---|
| EP | 0007981 A1 * | 2/1980 | ............... | B60B 7/01 |
| WO | WO-2021113895 A1 * | 6/2021 | ........... | B60B 21/026 |

OTHER PUBLICATIONS

Machine translation of CN-115157933-A, Zheng L, Oct. 11, 2022 (Year: 2022).*

* cited by examiner

ANTI-ROLL OSCILLATION LANDING WHEEL RIMS FOR ROTORCRAFT

TECHNICAL FIELD OF THE DISCLOSURE

The present disclosure relates, in general, to landing wheel systems for rotorcraft and, in particular, to anti-roll oscillation landing wheel rims that support and stiffen the tire of the landing wheel to reduce roll oscillations of the rotorcraft in the light on gear phase of takeoff and landing.

BACKGROUND

The landing gear systems of rotorcraft such as helicopters often utilize landing wheels to enable taxi operations while on the ground as well as run-on landings. One drawback of landing wheels is that the rotorcraft is susceptible to roll oscillations about the roll axis of the rotorcraft during takeoff and landing. Roll oscillations typically occur in the light on gear phase of takeoff and landing, during which the full weight of the rotorcraft is not borne by the landing wheels. For example, light on gear roll oscillations may occur when the landing wheels support 3-15 percent of the helicopter's weight, although light on gear roll oscillations may occur at any time when the landing wheels support less than the full weight of the helicopter. Light on gear roll oscillations are partly attributable to the flexibility, especially the lateral flexibility, of the landing wheel tires. Flexible wheels or tires are not conducive to damping fuselage roll oscillations and may allow for significant lateral motion, acting like springs that reinforce the roll oscillations. In a helicopter takeoff or landing, roll oscillations may be introduced when the main rotor regressing lag mode frequency coalesces with the fuselage roll mode frequency. This may occur during touchdown when one landing gear touches the ground before the other and thereby imparts a slight roll on the helicopter fuselage. The imparted fuselage roll laterally accelerates the main rotor and can initiate the main rotor regressing lag mode which leads to fuselage roll oscillation. Other factors relating to light on gear roll oscillations include the proximity of the landing wheels to one another as well as the fuselage roll inertia. Depending on their amplitude, light on gear roll oscillations may be considered undesirable and should be minimized.

Prior methods for reducing light on gear roll oscillations have included tuning of the main rotor blade lead-lag dampers or stiffening the attachment point(s) of the main rotor blades, although such stiffening adds weight to the rotorcraft. Stiffness tuning of the landing gear has also been attempted to affect the fuselage light on gear roll frequency, although such tuning may require additional adjustment to meet shock absorption requirements of a hard landing. Attempts have also been made to implement active control laws that stir the cyclic control to counteract the main rotor regressing lag mode frequency. Active control laws, however, are not easily implemented on all rotorcraft and may be less reliable than a hardware solution. Accordingly, a need has arisen for landing wheel systems that are robust to reduce or minimize light on gear roll oscillations while avoiding the drawbacks of prior methods.

SUMMARY

In a first aspect, the present disclosure is directed to a landing wheel assembly for a rotorcraft having a light on gear phase during takeoff and landing. The landing wheel assembly includes a tire and an anti-roll oscillation rim. The tire has first and second side walls and forms a center aperture. The anti-roll oscillation rim includes a center disc disposed in the aperture of the tire, a first side wall support plate protruding from the center disc and extending at least 25 percent of the vertical length of the first side wall of the tire and a second side wall support plate protruding from the center disc and extending at least 25 percent of the vertical length of the second side wall of the tire. The first and second side wall support plates support the first and second side walls, respectively, to stiffen the tire in the light on gear phase of takeoff and landing, thereby reducing roll oscillations of the rotorcraft.

In some embodiments, the center disc may include first and second center disc halves, the first side wall support plate protruding from the first center disc half and the second side wall support plate protruding from the second center disc half. In certain embodiments, the first center disc half may be coupled to the second center disc half to sandwich the tire therebetween. In some embodiments, the side wall support plates may be curved to contour the side walls. In other embodiments, the side wall support plates may be flat side wall support plates. In certain embodiments, the side wall support plates may be integral with the center disc. In other embodiments, the side wall support plates may be separable from the center disc and coupled to the center disc with one or more fasteners. In some embodiments, each side wall support plate may have a center interface portion, the center interface portion coupled to the center disc with the one or more fasteners. In certain embodiments, the anti-roll oscillation rim may include a plurality of side wall support plates including the first and second side wall support plates, the side wall support plates interchangeably attachable to the center disc. In some embodiments, the side wall support plates may be formed from a different material than the center disc. In certain embodiments, the side wall support plates may be formed from steel and the center disc may be formed from aluminum. In some embodiments, the first and second side wall support plates may extend at least 50 percent or at least 75 percent of the vertical lengths of the first and second side walls of the tire, respectively. In certain embodiments, the first side wall support plate may cover at least 25 percent of the surface area of the first side wall and the second side wall support plate may cover at least 25 percent of the surface area of the second side wall. In some embodiments, the proximal end of each side wall may form a bead and each side wall support plate may have a tire-facing surface forming a bead rest, the bead rests receiving the beads of the tire to secure the tire to the anti-roll oscillation rim. In certain embodiments, the bead rests may be closer to the proximal ends of the side wall support plates than the distal ends of the side wall support plates.

In a second aspect, the present disclosure is directed to a helicopter having a light on gear phase during takeoff and landing. The helicopter includes a fuselage and a landing gear system coupled to the underside of the fuselage. The landing gear system includes port and starboard landing wheel assemblies. Each landing wheel assembly includes a tire and an anti-roll oscillation rim. The tire includes inboard and outboard side walls and forms a center aperture. The anti-roll oscillation rim includes a center disc disposed in the aperture of the tire, an inboard side wall support plate protruding from the center disc and extending at least 25 percent of the vertical length of the inboard side wall of the tire and an outboard side wall support plate protruding from the center disc and extending at least 25 percent of the vertical length of the outboard side wall of the tire. The side wall support plates support the side walls to stiffen the tires in the light on gear phase of takeoff and landing, thereby reducing roll oscillations of the helicopter.

In some embodiments, the underside of the fuselage may form port and starboard wheel bays, the port and starboard landing wheel assemblies retractable into the port and starboard wheel bays, respectively. In certain embodiments, the side wall support plates may increase a roll oscillation mode frequency of the helicopter in the light on gear phase of takeoff and landing. In some embodiments, the side wall support plates may reduce lateral flexibility of the tires in the light on gear phase of takeoff and landing.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
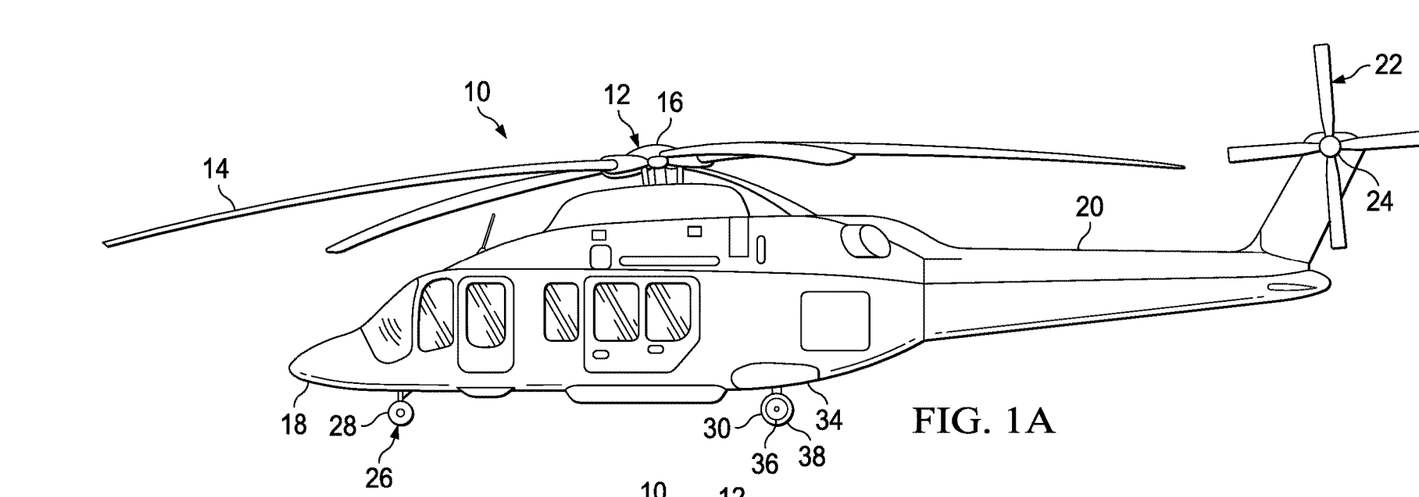
FIGS. 1A-1B are schematic illustrations of a rotorcraft implementing landing gear including anti-roll oscillation rims in accordance with embodiments of the present disclosure.
Figure 1B:
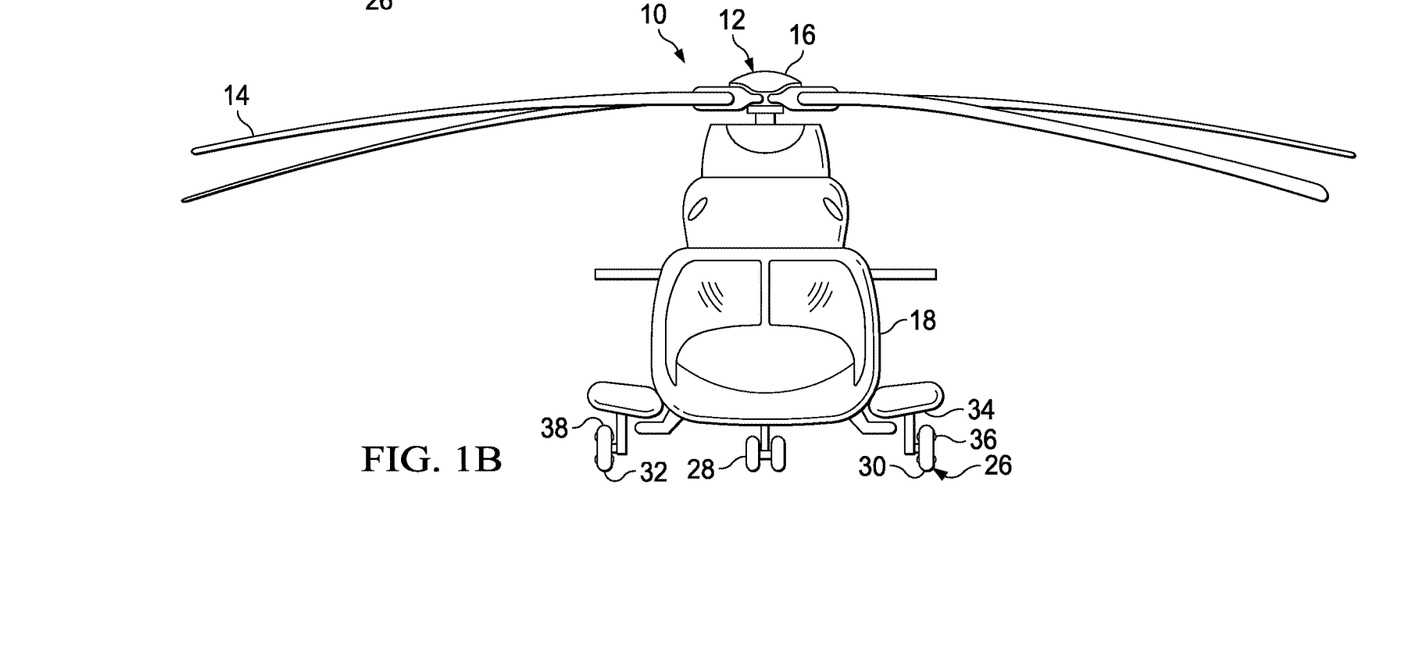

Referring to FIGS. 1A-1B in the drawings, a rotorcraft depicted as a helicopter is schematically illustrated and generally designated 10. The primary propulsion assembly of rotorcraft 10 is a main rotor assembly 12 powered by one or more engines via a main rotor gearbox. Main rotor assembly 12 includes a plurality of rotor blade assemblies 14 extending radially outward from a main rotor hub 16. Main rotor assembly 12 is coupled to a fuselage 18. Main rotor hub 16 is rotatable relative to fuselage 18. The pitch of rotor blade assemblies 14 can be collectively and/or cyclically manipulated to selectively control direction, thrust and lift of rotorcraft 10. A tailboom 20 extends from fuselage 18 in the aft direction. An anti-torque system 22 includes a tail rotor 24 that is rotatably coupled to the aft portion of tailboom 20. Anti-torque system 22 controls the yaw of rotorcraft 10.

A landing gear system 26 provides ground support for rotorcraft 10. Landing gear system 26 includes nose landing wheel assembly 28, port landing wheel assembly 30 and starboard landing wheel assembly 32 coupled to the underside of fuselage 18. In some embodiments, landing wheel assemblies 28, 30, 32 may be retractable into respective wheel bays 34 formed on the underside of fuselage 18. Port and starboard landing wheel assemblies 30, 32 include anti-roll oscillations rims 36, which support the side walls of tires 38 to stiffen tires 38 in the light on gear phase of takeoff and landing, thereby reducing, suppressing or eliminating the roll oscillations experienced by rotorcraft 10.

It should be appreciated that rotorcraft 10 is merely illustrative of a variety of aircraft that can implement the embodiments disclosed herein. Indeed, anti-roll oscillations rims 36 may be implemented on any rotorcraft. Other aircraft implementations can include hybrid aircraft, tiltwing aircraft, tiltrotor aircraft, quad tiltrotor aircraft, quadcopters, unmanned aircraft, gyrocopters, compound helicopters, tailsitter aircraft, drones and the like. As such, those skilled in the art will recognize that anti-roll oscillations rims 36 can be integrated into a variety of aircraft configurations. It should be appreciated that even though aircraft are particularly well-suited to implement the embodiments of the present disclosure, non-aircraft vehicles and devices can also implement the embodiments.

Figure 2A:
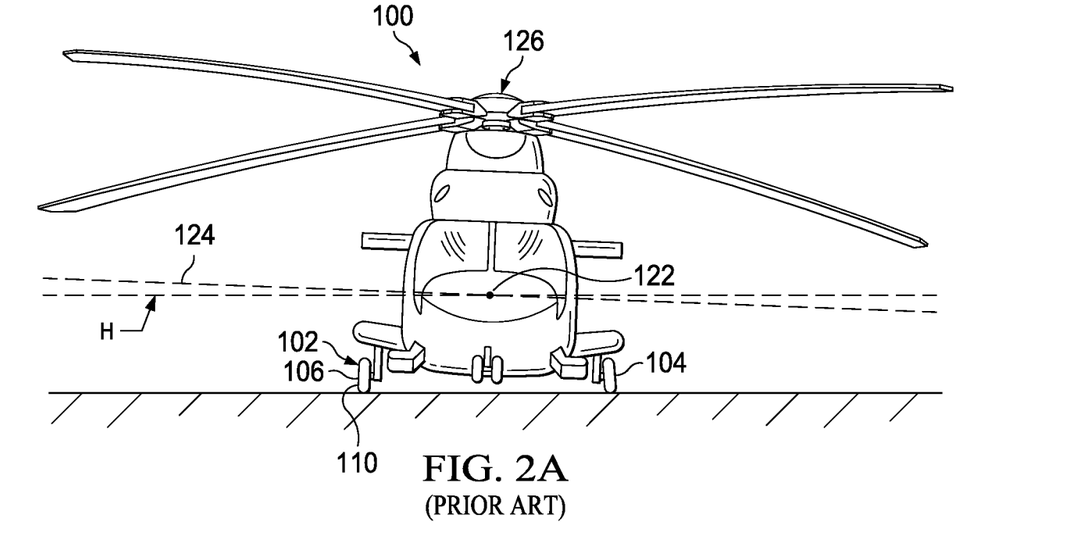
FIGS. 2A-2E are various views of previously-implemented landing gear on a helicopter.
Figure 2B:
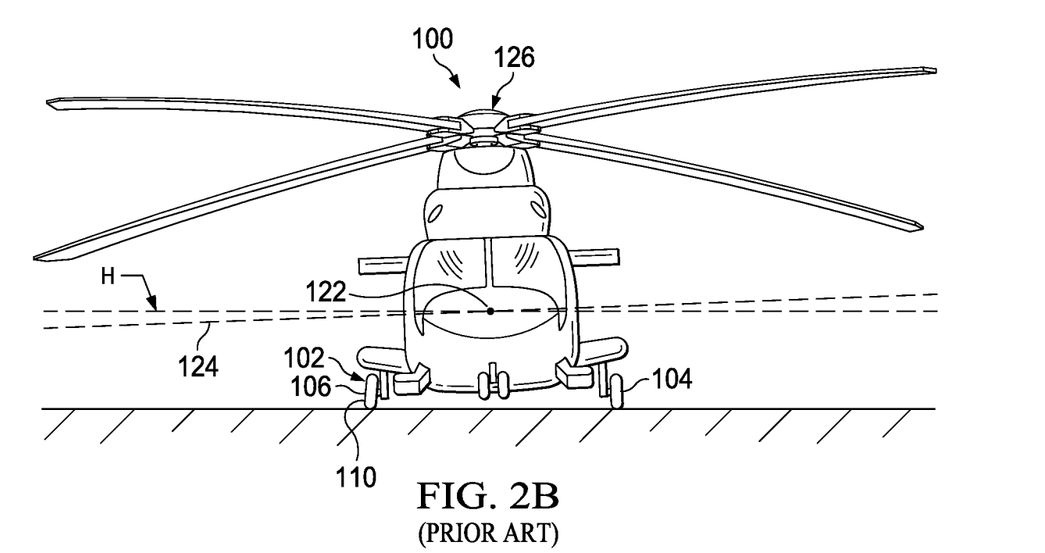
Figures 2C, 2D, 2E:
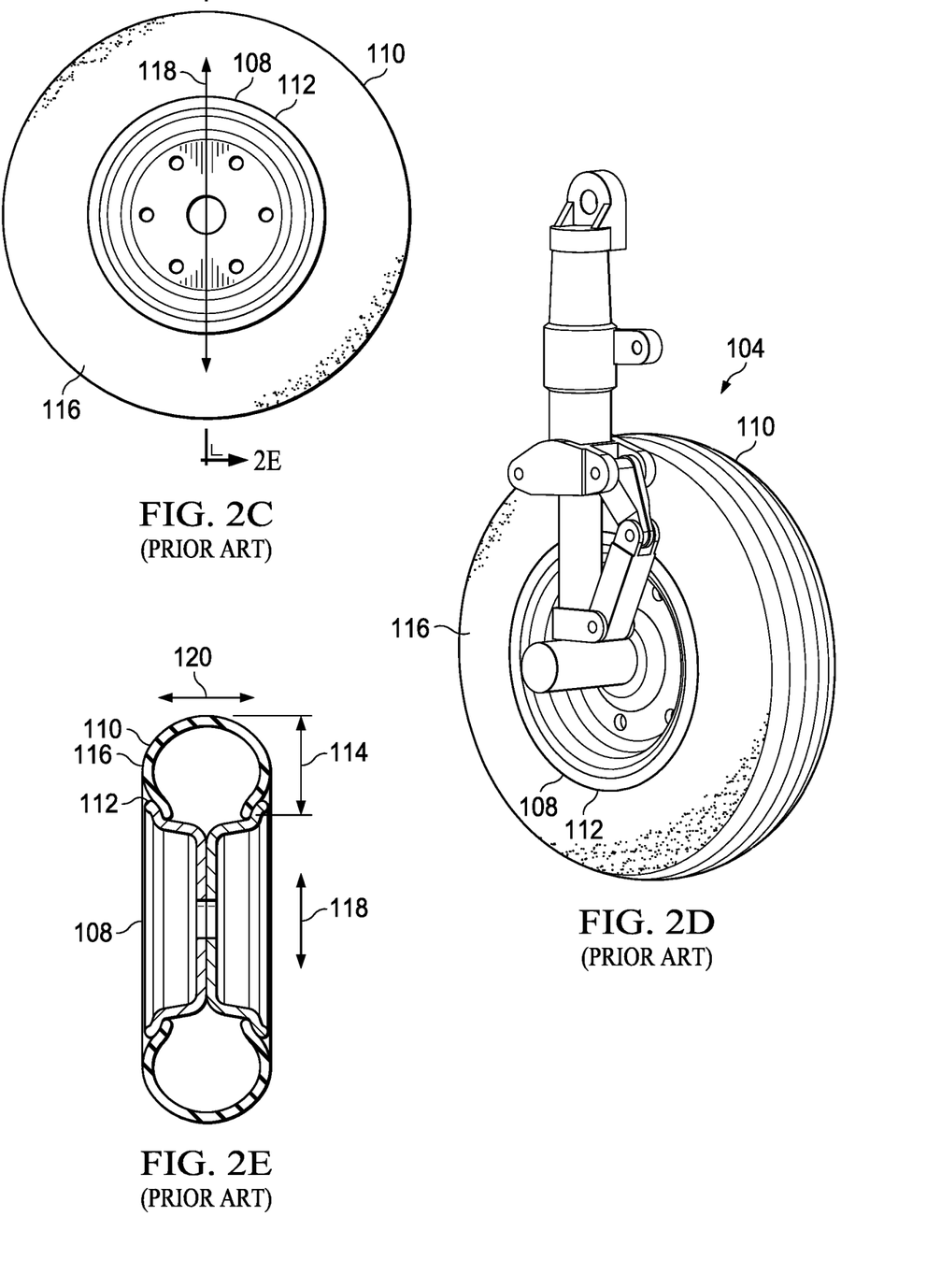

Referring to FIGS. 2A-2E in the drawings, a helicopter implementing a previous type of landing gear system is schematically illustrated and generally designated 100. Landing gear system 102 of helicopter 100 includes port and starboard landing wheel assemblies 104, 106. As best seen in FIGS. 2C-2E, port landing wheel assembly 104, which is similar to starboard landing wheel assembly 106, includes a rim 108 disposed in the center aperture of tire 110. Rim 108 forms a lip 112 onto which tire 110 is mounted. Lip 112 extends only a small distance (10 percent or less) along vertical length 114 of side walls 116 of tire 110, thus providing no support for side walls 116. By failing to provide support for side walls 116, tire 110 exhibits a high level of flexibility in both the vertical direction 118 and lateral direction 120. This high level of tire flexibility substantially contributes to the roll oscillations experienced by helicopter 100 during takeoff and landing. Roll oscillations about roll axis 122 of helicopter 100 typically occur in the light on gear phase of takeoff and landing shown in FIGS. 2A-2B, during which the full weight of helicopter 100 is not borne by landing gear system 102. The flexibility of tires 110, particularly in lateral direction 120, caused by the inadequate support provided by rims 108 is not conducive to damping roll oscillations and, in fact, allows for significant motion by which tires 110 act like springs to store energy that reinforces the roll oscillations. FIGS. 2A-2B illustrate two phases of roll oscillations experienced by helicopter 100 during the light on gear phase of takeoff or landing in which lateral axis 124 of helicopter 100 is offset from a horizontal plane H that is normal to the local vertical in the earth's reference frame. Roll oscillations typically occur quickly and repeatedly so as to rock helicopter 100 about roll axis 122. In FIG. 2A the port side of helicopter 100 is rolled downward and in FIG. 2B the starboard side of helicopter 100 is rolled downward. In a takeoff or landing, roll oscillations may be introduced when the main rotor regressing lag mode frequency coalesces with the fuselage roll mode frequency. This may occur during touchdown when one landing wheel touches the ground before the other and thereby imparts a slight roll on the helicopter fuselage. The imparted fuselage roll laterally accelerates main rotor 126 and can initiate the main rotor regressing lag mode which leads to fuselage roll oscillation. Other factors relating to light on gear roll oscillations include the proximity of landing wheel assemblies 104, 106 to one another as well as the fuselage roll inertia. Depending on their amplitude, light on gear roll oscillations may be considered undesirable and should be minimized.

Prior methods for reducing light on gear roll oscillations have included tuning of the main rotor blade lead-lag dampers or stiffening the attachment point(s) of the main rotor blades, although such stiffening adds weight to helicopter 100. Stiffness tuning of the landing gear has also been attempted to affect the fuselage light on gear roll frequency, although such tuning may require additional adjustment to meet shock absorption requirements of a hard landing. Attempts have also been made to implement active control laws that stir the cyclic control to counteract the main rotor regressing lag mode frequency. Active control laws, however, are not easily implemented on all rotorcraft and may be less reliable than a hardware solution. The illustrative embodiments disclosed herein reduce the roll oscillations experienced by rotorcraft in the light on gear phase of takeoff and landing while avoiding the drawbacks of the aforementioned prior methods.

Figures 3A, 3B, 3C:
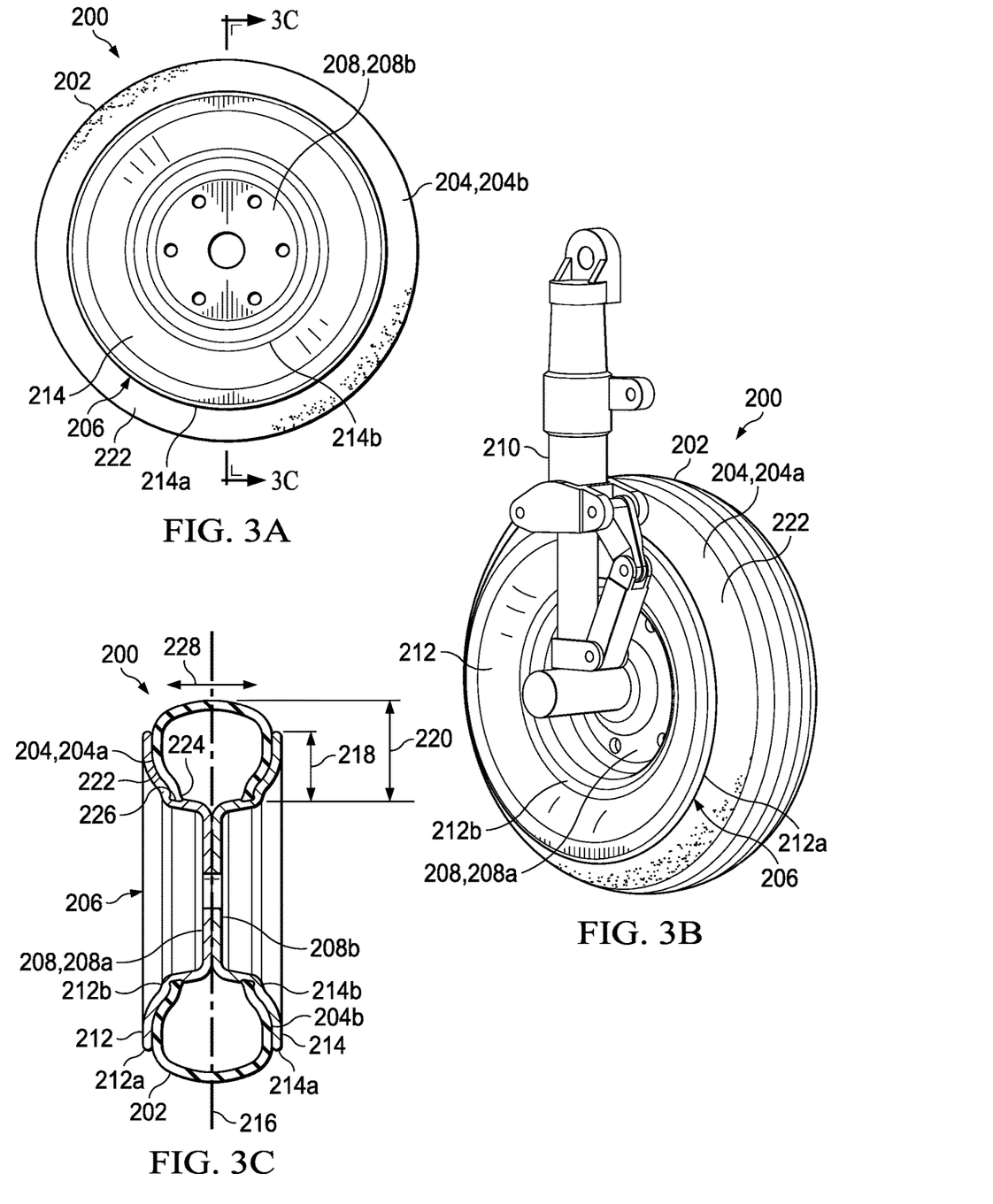
FIGS. 3A-3C are various views of a landing wheel assembly having an anti-roll oscillation rim in accordance with embodiments of the present disclosure.

Referring to FIGS. 3A-3C, a landing wheel assembly for a rotorcraft such as rotorcraft 10 in FIGS. 1A-1B is schematically illustrated and generally designated 200. Landing wheel assembly 200 may be implemented as port landing wheel assembly 30 of rotorcraft 10. Due to the similarity between port landing wheel assembly 30 and starboard landing wheel assembly 32 in FIGS. 1A-1B, one having ordinary skill in the art will fully appreciate an understanding of both port and starboard landing wheel assemblies 30, 32 based upon the disclosure herein of landing wheel assembly 200. In yet other embodiments, landing wheel assembly 200 may be implemented as nose landing wheel assembly 28 of rotorcraft 10 in FIGS. 1A-1B.

Landing wheel assembly 200 includes tire 202 with side walls 204. Landing wheel assembly 200 also includes anti-roll oscillation rim 206 having a center disc 208 disposed in the center aperture of tire 202 and rotatably coupled to strut 210 of landing wheel assembly 200. Center disc 208 is formed from inboard center disc half 208a and outboard center disc half 208b. Anti-roll oscillation rim 206 includes an inboard side wall support plate, or flange, 212 protruding from inboard center disc half 208a and an outboard side wall support plate, or flange, 214 protruding from outboard center disc half 208b. Inboard and outboard side wall support plates 212, 214 are integral with inboard and outboard center disc halves 208a, 208b, respectively. Inboard center disc half 208a is coupled to outboard center disc half 208b such that tire 202 is sandwiched between side wall support plates 212, 214.

Side wall support plates 212, 214 are curved to contour the shape of tire 202. More particularly, inboard side wall support plate 212 is curved to contour inboard side wall 204a and outboard side wall support plate 214 is curved to contour outboard side wall 204b. Side wall support plates 212, 214 curve away from longitudinal centerline 216 of tire 202 such that distal ends 212a, 214a of side wall support plates 212, 214 are further away from longitudinal centerline 216 than proximal ends 212b, 214b of side wall support plates 212, 214, as best seen in FIG. 3C. In other embodiments, however, distal ends 212a, 214a of side wall support plates 212, 214 may be closer to longitudinal centerline 216 than proximal ends 212b, 214b of side wall support plates 212, 214. The curvature of side wall support plates 212, 214 may be determined by a number of factors such as the tire type, aircraft type and/or mission as well as the desired stiffness of tire 202. The distance 218 by which side wall support plates 212, 214 extend along vertical length 220 of side walls 204 may also depend on these factors. For example, side wall support plates 212, 214 may extend at least 10 percent, at least 25 percent, at least 50 percent, at least 75 percent or at least 90 percent of vertical length 220 of side walls 204. In the illustrated embodiment, length 218 of side wall support plates 212, 214 is approximately 70 percent of vertical length 220 of side walls 204, thus reducing the amount of exposed rubber of tire 202. Side wall support plates 212, 214 also cover additional surface area 222 of side walls 204 as compared to previous tire rims. For example, each side wall support plate 212, 214 may cover at least 10 percent, at least 25 percent, at least 50 percent, at least 75 percent or at least 90 percent of the surface area 222 of a respective side wall 204 of tire 202.

The proximal ends of side walls 204 form beads 224 that extend around the circumference of the center aperture of tire 202. The tire-facing surfaces of side wall support plates 212, 214 form bead rests 226, which extend in a circle along side wall support plates 212, 214 and receive beads 224 to secure tire 202 to anti-roll oscillation rim 206. Bead rests 226 are closer to proximal ends 212b, 214b of side wall support plates 212, 214 than distal ends 212a, 214a of side wall support plates 212, 214 so that bead rests 226 are deep within the pocket formed by side wall support plates 212, 214. In the illustrated embodiment, bead rests 226 are located substantially at proximal ends 212b, 214b of side wall support plates 212, 214. The exact location of bead rests 226 on the tire-facing surfaces of side wall support plates 212, 214 may depend on the type or shape of tire 202 as well as other factors.

Side wall support plates 212, 214 have a number of effects on tire 202. Side wall support plates 212, 214 reduce the flexibility of tire 202, including the lateral flexibility of tire 202 in direction 228, providing less opportunity for the rubber of tire 202 to flex. The support provided by side wall support plates 212, 214 therefore stiffens tire 202 in the light on gear phase of takeoff and landing. A stiffer tire transfers energy to strut 210 or the oleo strut thereof, which acts as a damper that dissipates the energy that causes roll oscillations into heat, thus facilitating the oleo strut to stroke without putting energy into the tire strain. A stiffer tire also raises the fuselage roll mode frequency so that it crosses the rotor regressing lag frequency early in the landing cycle rather than later, when more weight is placed on the landing gear. Any combination of these aforementioned effects of side wall support plates 212, 214 on tire 202 reduces or eliminates the roll oscillations experienced by the rotorcraft. Furthermore, anti-roll oscillation rim 206 is simple to fabricate, fits within existing wheel bays and is compatible for use with existing or conventional qualified tires.

Figure 4A:
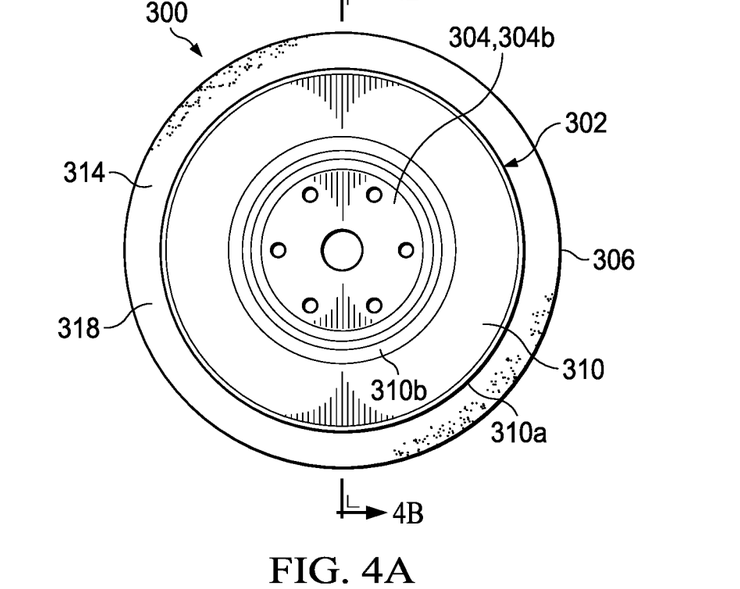
FIGS. 4A-4B are various views of a landing wheel assembly having an anti-roll oscillation rim with flat side wall support plates in accordance with embodiments of the present disclosure.
Figure 4B:
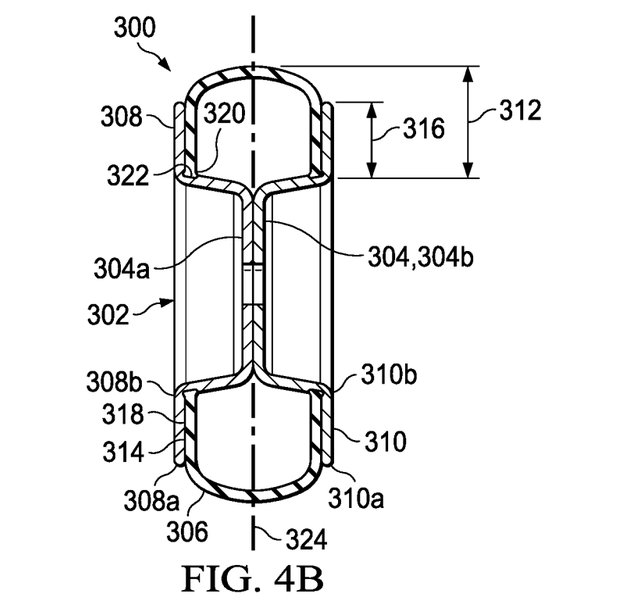

Referring to FIGS. 4A-4B in the drawings, a landing wheel assembly for a rotorcraft such as rotorcraft 10 in FIGS. 1A-1B is schematically illustrated and generally designated 300. Landing wheel assembly 300 may be implemented as port landing wheel assembly 30 of rotorcraft 10. Due to the similarity between port landing wheel assembly 30 and starboard landing wheel assembly 32 in FIGS. 1A-1B, one having ordinary skill in the art will fully appreciate an understanding of both port and starboard landing wheel assemblies 30, 32 based upon the disclosure herein of landing wheel assembly 300. In yet other embodiments, landing wheel assembly 300 may be implemented as nose landing wheel assembly 28 of rotorcraft 10 in FIGS. 1A-1B.

Landing wheel assembly 300 includes anti-roll oscillation rim 302 having a center disc 304, formed from center disc halves 304a, 304b, disposed in the center aperture of tire 306. Anti-roll oscillation rim 302 includes inboard and outboard side wall support plates 308, 310 protruding from inboard and outboard center disc halves 304a, 304b, respectively. Inboard and outboard side wall support plates 308, 310 are integral with inboard and outboard center disc halves 304a, 304b, respectively. Inboard center disc half 304a is coupled to outboard center disc half 304b such that tire 306 is sandwiched between side wall support plates 308, 310.

Side wall support plates 308, 310 may extend at least 10 percent, at least 25 percent, at least 50 percent, at least 75 percent or at least 90 percent of vertical length 312 of side walls 314. In the illustrated embodiment, length 316 of side wall support plates 308, 310 is approximately 70-80 percent of vertical length 312 of side walls 314. Side wall support plates 308, 310 also cover additional surface area 318 of side walls 314 as compared to previous tire rims. For example, each side wall support plate 308, 310 may cover at least 10 percent, at least 25 percent, at least 50 percent, at least 75 percent or at least 90 percent of the surface area 318 of a respective side wall 314 of tire 306. The proximal ends of side walls 314 form beads 320 that extend around the circumference of the center aperture of tire 306. The tire-facing surfaces of side wall support plates 308, 310 form bead rests 322, which extend in a circle along side wall support plates 308, 310 and receive beads 320 to secure tire 306 to anti-roll oscillation rim 302.

Side wall support plates 308, 310 are flat plates that do not have the curvature of side wall support plates 212, 214 in FIGS. 3A-3C. Distal ends 308a, 310a of side wall support plates 308, 310 are substantially the same distance from longitudinal centerline 324 as proximal ends 308b, 310b of side wall support plates 308, 310, as best seen in FIG. 4B. In some embodiments, the flatness of side wall support plates 308, 310 may impart certain stiffness characteristics to tire 306 deemed suitable for the particular aircraft or mission. Flat side wall support plates 308, 310 may also be preferred for certain tire types, tire shapes or wheel bay configurations.

Figure 5A:
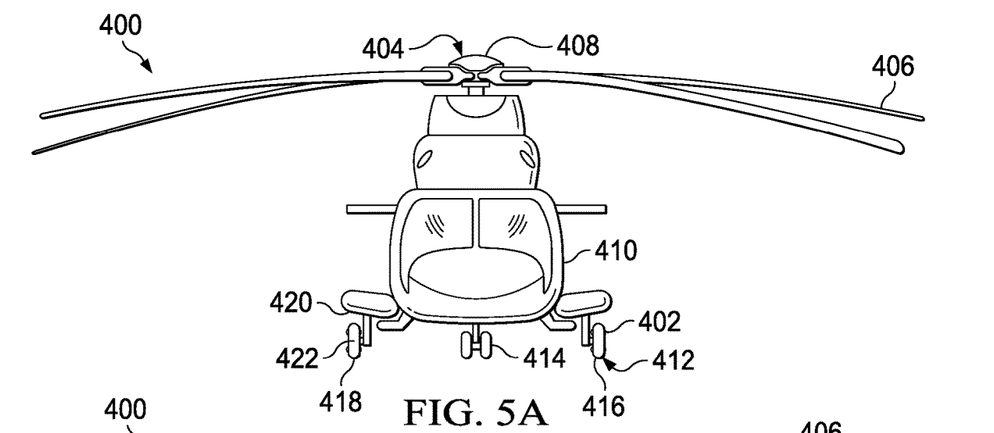
FIGS. 5A-5C are schematic illustrations of a helicopter having anti-roll oscillation rims in a sequential landing operation scenario in accordance with embodiments of the present disclosure.
Figure 5B:
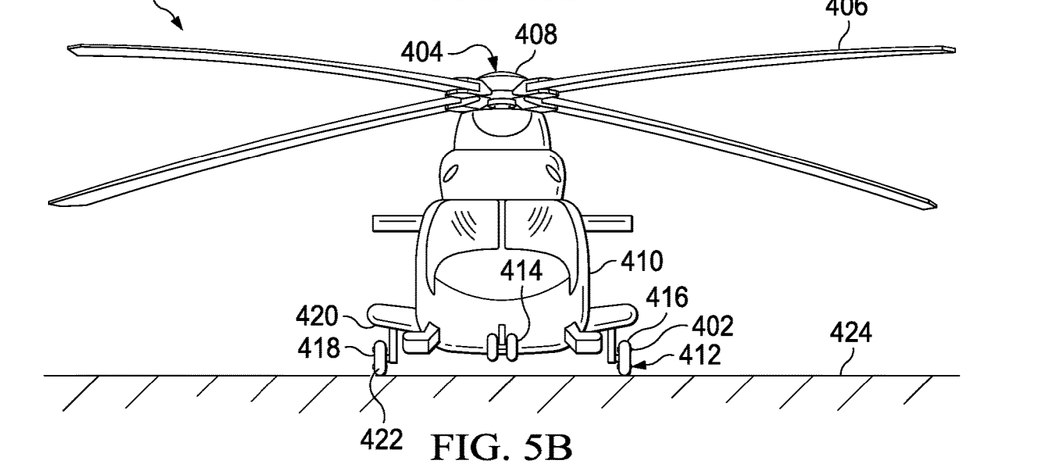
Figure 5C:
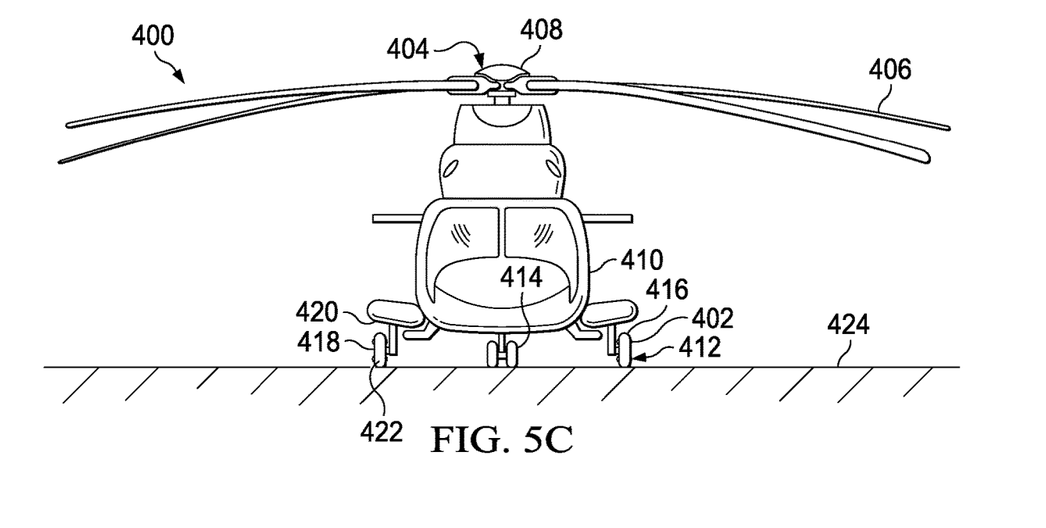

Referring to FIGS. 5A-5C in the drawings, a sequential landing operation scenario of helicopter 400 including anti-roll oscillations rims 402 is depicted. The primary propulsion assembly of helicopter 400 is a main rotor assembly 404 powered by an engine via a main rotor gearbox. Main rotor assembly 404 includes a plurality of rotor blade assemblies 406 extending radially outward from a main rotor hub 408. Main rotor assembly 404 is coupled to a fuselage 410. Main rotor hub 408 is rotatable relative to fuselage 410. The pitch of rotor blade assemblies 406 can be collectively and/or cyclically manipulated to selectively control direction, thrust and lift of helicopter 400.

A landing gear system 412 provides ground support for helicopter 400. Landing gear system 412 includes nose landing wheel assembly 414, port landing wheel assembly 416 and starboard landing wheel assembly 418 coupled to the underside of fuselage 410. In some embodiments, landing wheel assemblies 414, 416, 418 may be retractable into respective wheel bays 420 formed on the underside of fuselage 410. Port and starboard landing wheel assemblies 416, 418 include anti-roll oscillations rims 402, which support the side walls of tires 422 to stiffen tires 422. In FIG. 5A, helicopter 400 is airborne and has begun its vertical descent in a landing operation. In FIG. 5B, helicopter 400 is in the light on gear phase of landing, in which port and starboard landing wheel assemblies 416, 418 have made light contact with landing surface 424. Nose landing wheel assembly 414 may or may not be in contact with landing surface 424 in the light on gear phase of landing. Helicopter 400 is most vulnerable to roll oscillations in the light on gear phase. Anti-roll oscillation rims 402, however, stiffen tires 422 so that tires 422 do not act as springs that store/release energy and thereby reinforce the roll oscillations. Thus, tires 422 with anti-roll oscillation rims 402 reduce or eliminate roll oscillations that may otherwise occur during the light on gear phase of landing. In FIG. 5C, helicopter 400 has performed a full landing on landing surface 424 so that the full weight of helicopter 400 rests on landing gear system 412.

Figure 6:
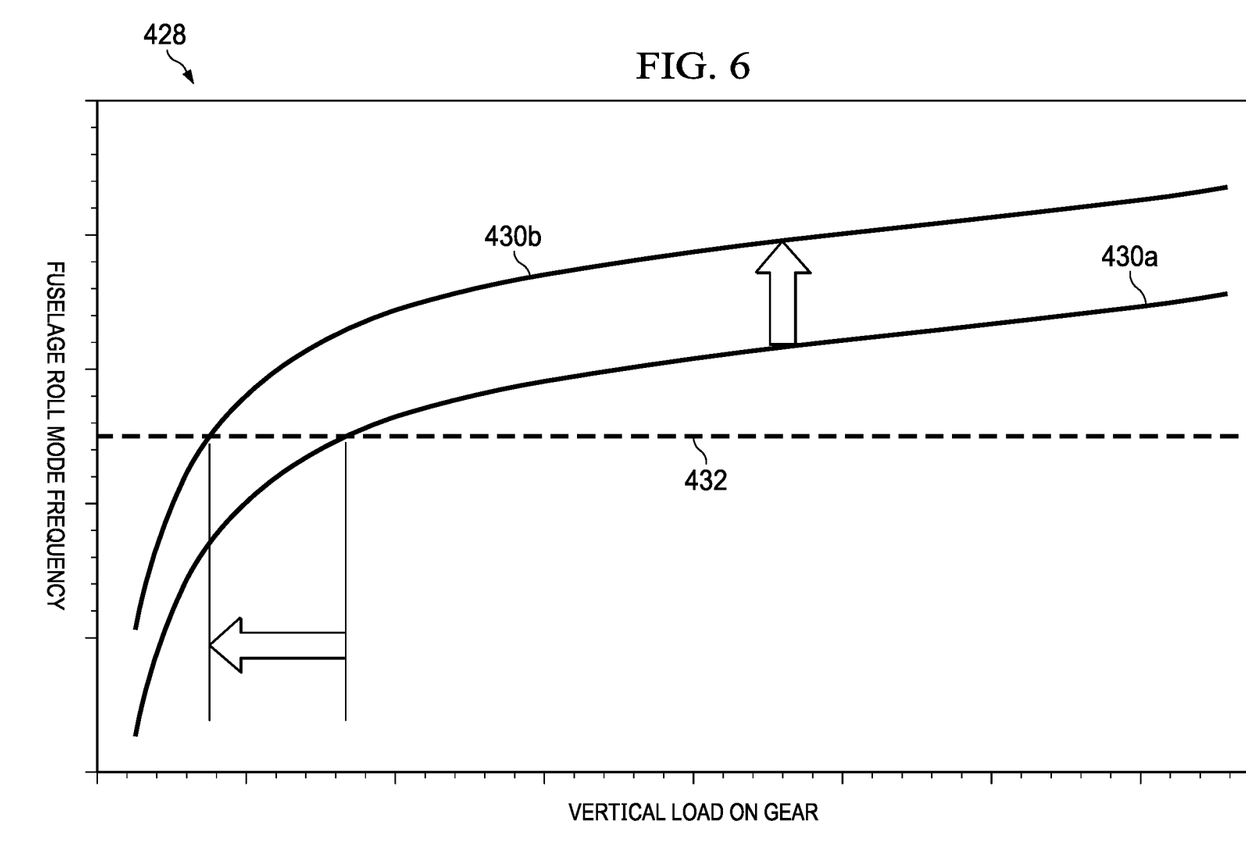
FIG. 6 is a chart illustrating the fuselage roll mode frequency of a rotorcraft as a function of the vertical load on the landing gear in a landing operation in accordance with embodiments of the present disclosure.

Referring additionally to FIG. 6 in the drawings, chart 428 illustrates a typical fuselage roll mode frequency 430b of helicopter 400 as a function of the vertical load on landing gear system 412 in a landing operation scenario. Main rotor assembly 404 has a rotor in-plane regressing lag mode frequency 432. Chart 428 shows a coupled system in which main rotor assembly 404 acts as a forcing function to which fuselage 410 reacts with roll oscillations of a certain magnitude. Fuselage roll mode frequency 430a represents the fuselage roll mode frequency of previous rotorcraft that lack the anti-roll oscillations rims of the illustrative embodiments. Fuselage roll mode frequency 430b, on the other hand, represents the fuselage roll mode frequency of helicopter 400, which includes anti-roll oscillations rims 402. Helicopter 400 experiences roll oscillations at the intersection between rotor in-plane frequency 432 and fuselage roll mode frequencies 430a, 430b. The side wall support plates of anti-roll oscillations rims 402 stiffen tires 422 to increase fuselage roll mode frequency 430b of helicopter 400 in the light on gear phase of landing such that rotor in-plane frequency 432 intersects with fuselage roll mode frequency 430b at a lighter weight on landing gear system 412, which lessens the roll oscillations experienced by helicopter 400 since less force is being reacted by the stiffened landing gear system 412, resulting in less energy available for inducing roll oscillation. In the non-limiting example of FIG. 6, the intersection of rotor in-plane frequency 432 and fuselage roll mode frequency 430b of helicopter 400 occurs at about 50 percent less weight on landing gear system 412 than the intersection of rotor in-plane frequency 432 and fuselage roll mode frequency 430a of previous rotorcraft, resulting in less severe roll oscillations of helicopter 400.

Figure 7A:
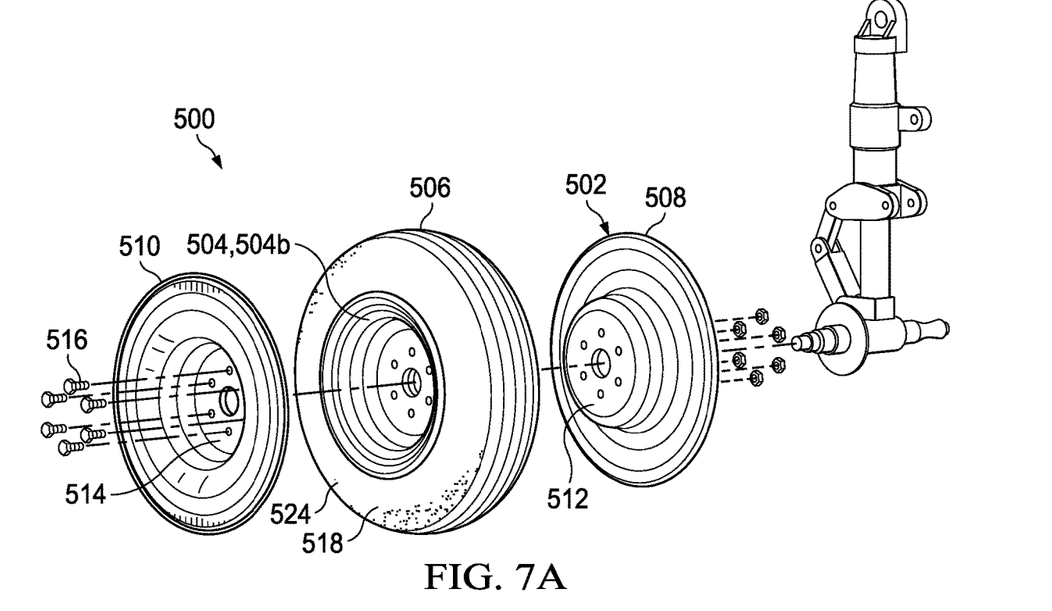
FIGS. 7A-7C are various views of a landing wheel assembly having a separable and non-integral anti-roll oscillation rim in accordance with embodiments of the present disclosure.
Figure 7B:
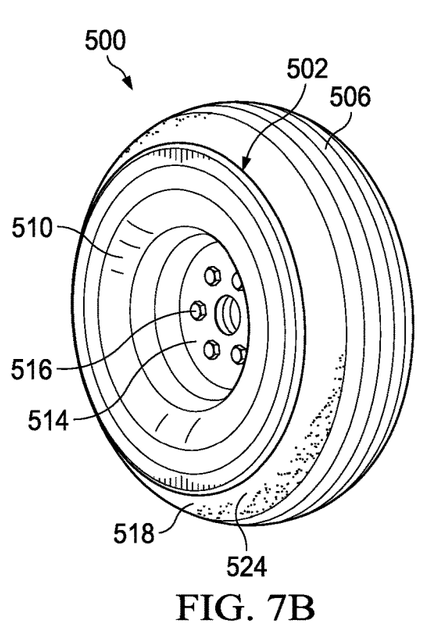
Figure 7C:
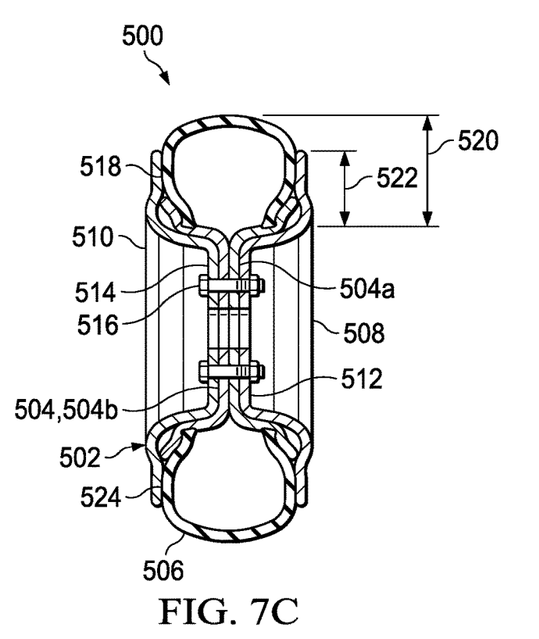

Referring to FIGS. 7A-7C in the drawings, a landing wheel assembly for a rotorcraft such as rotorcraft 10 in FIGS. 1A-1B is schematically illustrated and generally designated 500. Landing wheel assembly 500 may be implemented as port landing wheel assembly 30 of rotorcraft 10. Due to the similarity between port landing wheel assembly 30 and starboard landing wheel assembly 32 in FIGS. 1A-1B, one having ordinary skill in the art will fully appreciate an understanding of both port and starboard landing wheel assemblies 30, 32 based upon the disclosure herein of landing wheel assembly 500. In yet other embodiments, landing wheel assembly 500 may be implemented as nose landing wheel assembly 28 of rotorcraft 10 in FIGS. 1A-1B.

Landing wheel assembly 500 includes anti-roll oscillation rim 502 having a center disc 504, formed from center disc halves 504a, 504b, disposed in the center aperture of tire 506. Anti-roll oscillation rim 502 includes inboard and outboard side wall support plates 508, 510. Side wall support plates 508, 510 are separate from and non-integral with center disc 504. Side wall support plates 508, 510 include center interface portions 512, 514, which are coupled to center disc halves 504a, 504b, respectively, using fasteners 516. In other embodiments, side wall support plates 508, 510 may be adhered, snapped or otherwise locked onto center disc halves 504a, 504b. When side wall support plates 508, 510 are coupled to center disc 504, tire 506 is sandwiched between side wall support plates 508, 510, which provide stiffening support to side walls 518 of tire 506. Side wall support plates 508, 510 may be formed from a different material than center disc 504. In one non-limiting example, center disc 504 is formed from aluminum and side wall support plates 508, 510 are formed from a stronger material such as steel to better withstand landing impacts.

Side wall support plates 508, 510 may extend at least 10 percent, at least 25 percent, at least 50 percent, at least 75 percent or at least 90 percent of vertical length 520 of side walls 518. In the illustrated embodiment, length 522 of side wall support plates 508, 510 is approximately 70-80 percent of vertical length 520 of side walls 518. Side wall support plates 508, 510 also cover additional surface area 524 of side walls 518. For example, each side wall support plate 508, 510 may cover at least 10 percent, at least 25 percent, at least 50 percent, at least 75 percent or at least 90 percent of the surface area 524 of a respective side wall 518 of tire 506. Side wall support plates 508, 510 may have the curved configuration of side wall support plates 212, 214 in FIGS. 3A-3C, the flat configuration of side wall support plates 308, 310 in FIGS. 4A-4B or an intermediate configuration. Furthermore, side wall support plates 508, 510 are interchangeably attachable to center disc 504 so that various side wall support plates of different shapes, sizes and compositions may be selectively coupled to center disc 504 depending on various factors such as the tire, mission or environmental conditions. For example, side wall support plates 508, 510 may be removed from landing wheel assembly 500 and a different set of side wall support plates having, for example, a reduced thickness or harder composition may be applied to landing wheel assembly 500 in their place. Side wall support plates 508, 510 may also be replaced in the event of damage thereto, without the need to replace underlying center disc 504, thereby saving costs.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A landing wheel assembly for a rotorcraft having a light on gear phase during takeoff and landing, the landing wheel assembly comprising:
   a tire including first and second side walls each having a vertical length, the first and second side walls each having a proximal end, the tire having a longitudinal centerline and forming a center aperture; and
   an anti-roll oscillation rim comprising:
   a center disc including first and second center disc halves disposed in the aperture of the tire and receiving the proximal ends of the first and second side walls of the tire;
   a first side wall support plate including a center interface portion separable from the center disc, the center interface portion of the first side wall support plate coupled to the first center disc half such that the first side wall support plate covers the first center disc half, the first side wall support plate extending at least 50 percent of the vertical length of the first side wall of the tire; and
   a second side wall support plate including a center interface portion separable from the center disc, the center interface portion of the second side wall support plate coupled to the second center disc half such that the second side wall support plate covers the second center disc half, the second side wall support plate extending at least 50 percent of the vertical length of the second side wall of the tire such that the first and second side wall support plates are symmetrical about the longitudinal centerline of the tire, the center disc halves and the side wall support plates each substantially covering the aperture of the tire;
   wherein, the first and second side wall support plates engage and support the first and second side walls, respectively, to stiffen the tire in the light on gear phase of takeoff and landing, thereby reducing roll oscillations of the rotorcraft.

2. The landing wheel assembly as recited in claim 1 wherein the first side wall support plate extends away from the first center disc half and the second side wall support plate extends away from the second center disc half.

3. The landing wheel assembly as recited in claim 1 wherein the first center disc half is coupled to the second center disc half to sandwich the tire therebetween.

4. The landing wheel assembly as recited in claim 1 wherein the first and second side wall support plates are curved to contour the first and second side walls.

5. The landing wheel assembly as recited in claim 1 wherein the first and second side wall support plates comprise flat side wall support plates.

6. The landing wheel assembly as recited in claim 1 wherein the first and second side wall support plates are coupled to the first and second center disc halves, respectively, with one or more fasteners.

7. The landing wheel assembly as recited in claim 1 wherein the center interface portions of the first and second side wall support plates are coupled to the first and second center disc halves, respectively, with one or more fasteners.

8. The landing wheel assembly as recited in claim 1 wherein the anti-roll oscillation rim comprises a plurality of side wall support plates including the first and second side wall support plates, the side wall support plates interchangeably attachable to the center disc.

9. The landing wheel assembly as recited in claim 1 wherein the first and second side wall support plates are formed from a different material than the center disc.

10. The landing wheel assembly as recited in claim 9 wherein the first and second side wall support plates are formed from steel and the center disc is formed from aluminum.

11. The landing wheel assembly as recited in claim 1 wherein the first and second side wall support plates extend at least 75 percent of the vertical lengths of the first and second side walls of the tire, respectively.

12. The landing wheel assembly as recited in claim 1 wherein each first and second side wall has a surface area, the first side wall support plate covering at least 25 percent of the surface area of the first side wall and the second side wall support plate covering at least 25 percent of the surface area of the second side wall.

13. The landing wheel assembly as recited in claim 1 wherein the proximal end of each first and second side wall forms a bead; and wherein, the first and second center disc halves each has a tire-facing surface forming a bead rest, the bead rests receiving the beads of the tire to secure the tire to the anti-roll oscillation rim.

14. The landing wheel assembly as recited in claim 13 wherein the bead rests are closer to proximal ends of support plate portions of the first and second side wall support plates than distal ends of the support plate portions of the first and second side wall support plates.

15. A helicopter having a light on gear phase during takeoff and landing, the helicopter comprising:

a fuselage; and a landing gear system coupled to an underside of the fuselage, the landing gear system including port and starboard landing wheel assemblies, each landing wheel assembly comprising:

a tire including inboard and outboard side walls each having a vertical length, the inboard and outboard side walls each having a proximal end, the tire having a longitudinal centerline and forming a center aperture; and an anti-roll oscillation rim comprising:

a center disc including inboard and outboard center disc halves disposed in the aperture of the tire and receiving the proximal ends of the inboard and outboard side walls of the tire;

an inboard side wall support plate including a center interface portion separable from the center disc, the center interface portion of the inboard side wall support plate coupled to the inboard center disc half such that the inboard side wall support plate covers the inboard center disc half, the inboard side wall support plate extending at least 50 percent of the vertical length of the inboard side wall of the tire; and an outboard side wall support plate including a center interface portion separable from the center disc, the center interface portion of the outboard side wall support plate coupled to the outboard center disc half such that the outboard side wall support plate covers the outboard center disc half, the outboard side wall support plate extending at least 50 percent of the vertical length of the outboard side wall of the tire such that the inboard and outboard side wall support plates are symmetrical about the longitudinal centerline of the tire, the center disc halves and the side wall support plates each substantially covering the aperture of the tire;

wherein, the side wall support plates engage and support the side walls to stiffen the tires in the light on gear phase of takeoff and landing, thereby reducing roll oscillations of the helicopter.

16. The helicopter as recited in claim 15 wherein the underside of the fuselage forms port and starboard wheel bays, and wherein the port and starboard landing wheel assemblies are retractable into the port and starboard wheel bays, respectively.

17. The helicopter as recited in claim 15 wherein the side wall support plates are configured to increase a roll oscillation mode frequency of the helicopter in the light on gear phase of takeoff and landing.

18. The helicopter as recited in claim 15 wherein the side wall support plates reduce lateral flexibility of the tires in the light on gear phase of takeoff and landing.

* * * * *